(12) United States Patent  
Berghella et al.

(10) Patent No.: US 7,946,818 B2  
(45) Date of Patent: May 24, 2011

(54) SHOCK ABSORBER FOR ADJUSTABLE PITCH PROPELLER WITH FEATHERING BLADES, PARTICULARLY FOR SAILERS

(75) Inventors: Fabio Berghella, Sobiate Olona (IT); Franco Masetti, Legnano (IT)

(73) Assignee: Marine Propeller S.R.L., Solbiate Olona (IT)

( * ) Notice: Subject to any disclaimer, the term of this patent is extended or adjusted under 35 U.S.C. 154(b) by 935 days.

(21) Appl. No.: 10/585,114

(22) PCT Filed: Dec. 30, 2003

(86) PCT No.: PCT/IT03/00878  
§ 371 (c)(1),  
(2), (4) Date: Aug. 31, 2007

(87) PCT Pub. No.: WO2005/063563  
PCT Pub. Date: Jul. 14, 2005

(65) Prior Publication Data  
US 2008/0145225 A1  Jun. 19, 2008

(51) Int. Cl.  
*B63H 1/15* (2006.01)

(52) U.S. Cl. ........ 416/117; 416/136; 416/140; 416/160; 416/500

(58) Field of Classification Search ................... 416/117, 416/135–137, 140, 151, 160, 500  
See application file for complete search history.

(56) References Cited

U.S. PATENT DOCUMENTS

| | | | | |
|---|---|---|---|---|
| 1,765,091 A | * | 6/1930 | Morris | 416/137 |
| 2,440,046 A | * | 4/1948 | Hautier | 416/162 |
| 2,998,080 A | | 8/1961 | Moore, Jr. | |
| 4,047,841 A | * | 9/1977 | Laurin | 416/140 |
| 4,140,434 A | * | 2/1979 | Bianchi | 416/140 |
| 5,203,675 A | * | 4/1993 | Marini | 416/140 |
| 5,554,003 A | * | 9/1996 | Hall | 416/140 |
| 6,158,960 A | | 12/2000 | Marsi | |

FOREIGN PATENT DOCUMENTS

| | | |
|---|---|---|
| GB | 467 488 | 6/1937 |
| GB | 1 236 657 | 6/1971 |

* cited by examiner

*Primary Examiner* — Christopher Verdier  
(74) *Attorney, Agent, or Firm* — Connolly Bove Lodge & Hutz LLP

(57) ABSTRACT

The lifetime of plural shock absorbing resilient inserts of an adjustable pitch propeller with feathering blades may be increased. According to an embodiment, stops are implemented between metal surfaces that may be reached only in the event of shocks of great violence and following a certain elastic deformation of the shock absorbing inserts, which remain partially compressed. At the bottom of each circular cavity housing a respective annular insert of elastomer of the flange of a first cylindrical sleeve directly keyed on the drive shaft of the propeller a hole coaxial and of greater diameter than the diameter of a central hole of the annular insert and of the relative engaging pin is formed. Pins projecting from the face of the terminal flange of a second circular sleeve extend through the coaxially formed holes at the bottom of the respective circular cavities of the flange of the first sleeve.

3 Claims, 2 Drawing Sheets

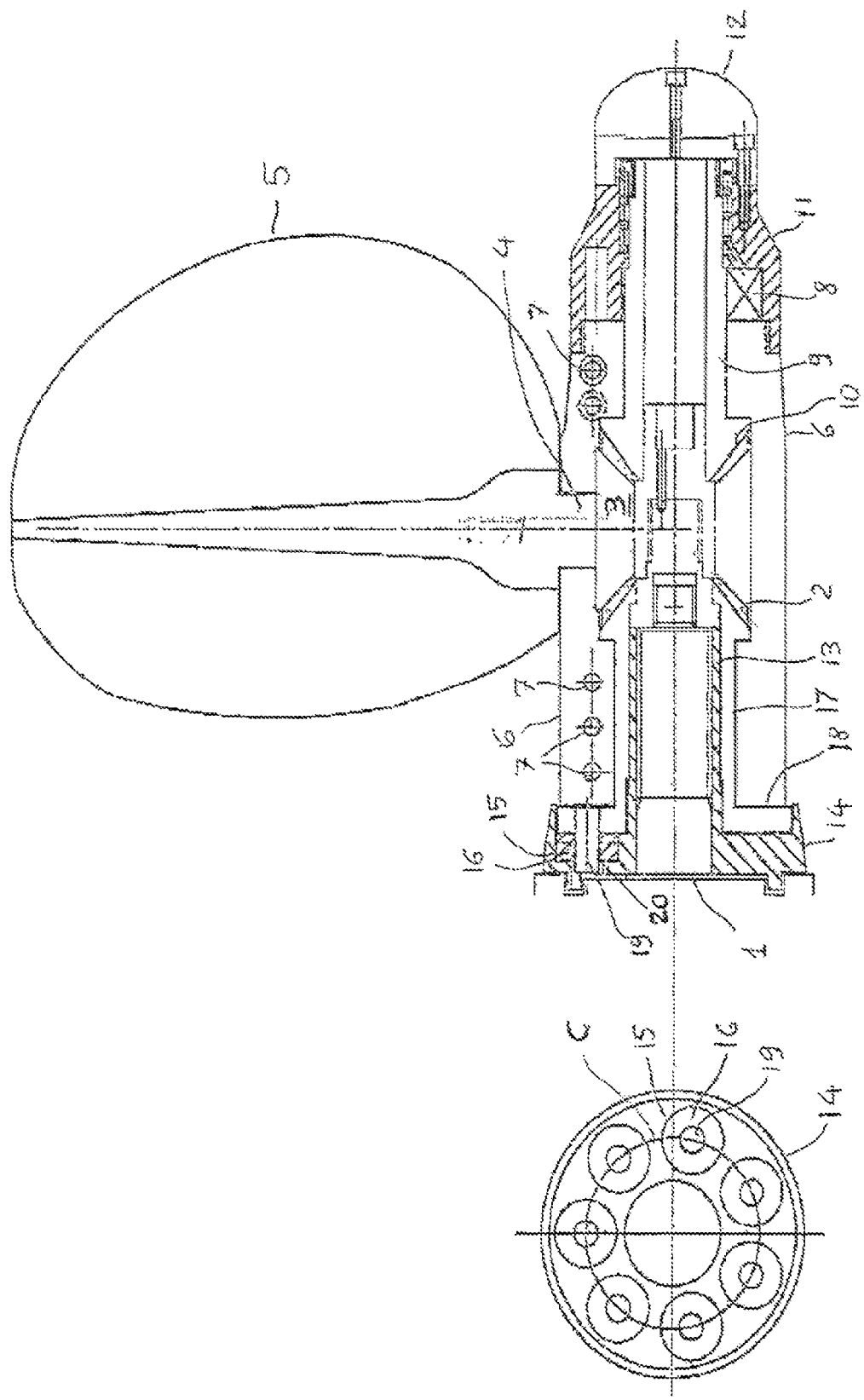

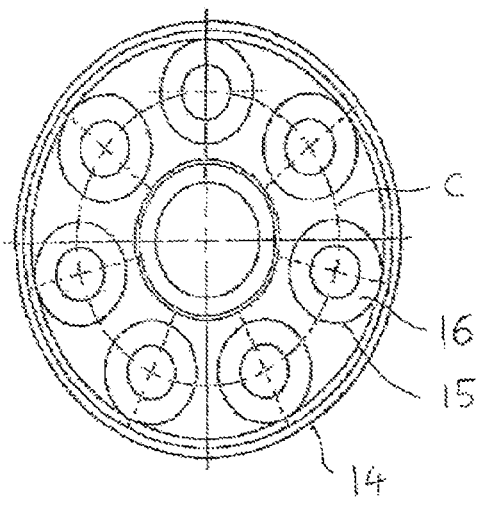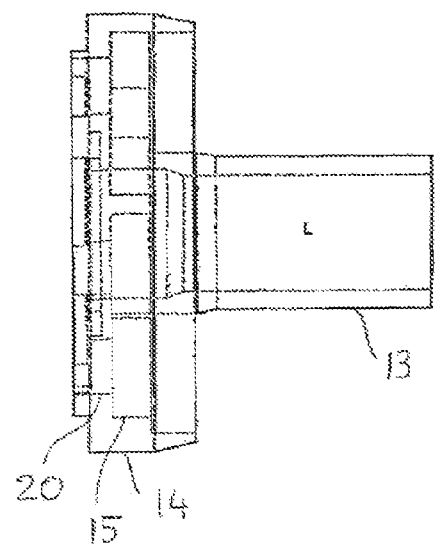
FIG. 2A                FIG. 2B
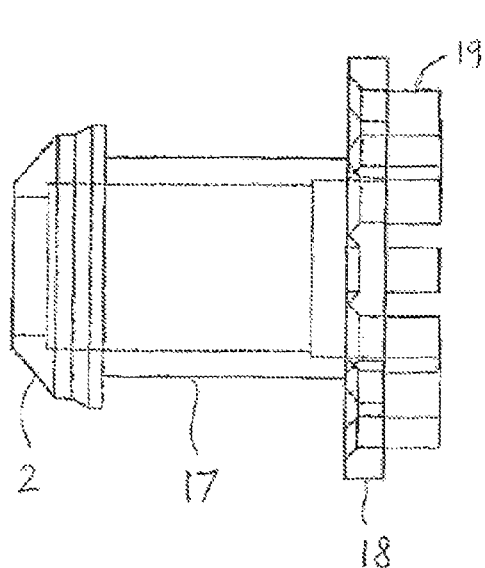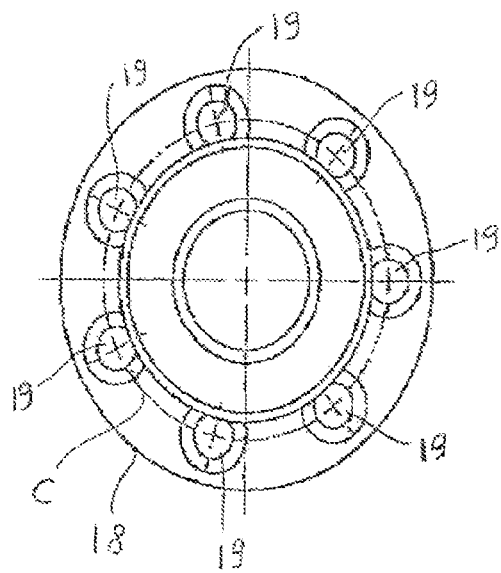
FIG. 3A                FIG. 3B

SHOCK ABSORBER FOR ADJUSTABLE PITCH PROPELLER WITH FEATHERING BLADES, PARTICULARLY FOR SAILERS

This application is a National Stage of PCT/IT2003/000878 filed Dec. 30, 2003.

BACKGROUND

The use of feathering blade propellers in sailers, that is propellers with blades capable of orienting themselves by rotating when idle in order to reduce drag when sailing is widespread.

On the other end, in order to optimize overall efficiency when motoring, the propeller should match beside with the characteristics of the engine (torque power and efficiency characteristics in function of the RPM) also with the hydrodynamic characteristics of the hull and eventually even to prevalent conditions of navigation.

An effective solution to these requirements is provided by the so called variable pitch propellers, that is by propellers wherein it is possible to modify the orientation of the blades in order to adapt within certain limits the pitch of the (screw) propeller to particular characteristics and/or conditions of use.

There is a category of commercially available propellers known as variable pitch propellers with feathering blades that combine both features and are especially used with auxiliary engines in sail boats.

Generally, these propellers comprise a pinion hub that is keyed or in any other way rotated by the drive shaft, on which engage two or more planet gears present at the base of the stems of the propeller blades.

Each blade, the stem of which is pivotally held in a hole of an outer shell, is free to rotate about the axis of the base planet gear upon the run of the planet gear on the conical pinion-hub through two opposite limit angles from a central or neutral position of the blades at which the two major faces of the blades are substantially parallel to the drive shaft under the hydraulic forces acting on it. The limit angles are pre-established by appropriate stops which determine the pitch of the propeller in the two directions of rotation.

The outer shell that is normally formed by sectors joined together by tangential screws, encloses the pinion-hub and the planet gear of the blades that are pivotally sustained in respective holes through the wall of the shell. Of course, the shell is free to rotate about the axis of the pinion-hub within said two opposite limit angles of orientation of the blades as it is either dragged or drags along the blades planetary engaged on the pinion-hub around its axis.

The stops of said arc of freedom of rotation of the shell-blade assembly about the pinion-hub axis are pre-established by the cooperation of circular sectors or radial teeth abutting one against the other and mechanically connected one to the outer shell and the other to the pinion-hub, in order to determine said stops in both directions of mutual rotation of the two parts.

Propellers of this type are described in U.S. Pat. Nos. 4,047,841 and 4,140,434.

In these known propellers, the pitch may be modified only by disassembling the propeller thus requiring the lifting of the boat out of the water whenever the pitch needs to be modified.

In the Italian Patent No. 1,214,251, of the same applicant, a feathering blade propeller was disclosed, the pitch of which could be adjusted without disassembling the propeller.

To this end, a sleeve engageable with the pinion-hub body at different angular positions and held so engaged by a spring is employed.

The stem of said sleeve passing through an axial hole of the ogive terminal of the propeller may be pulled outwardly against the contrasting force exerted by the spring to disengage the sleeve from the pinion-hub and which may then he reengaged in a different angular position on the pinion-hub, thus modifying the pitch.

In subsequent Italian Patents Nos. 1,235,687 and 1,235,831, of the same applicant, further improved propellers of this type were disclosed, according to which it was made possible to adjust the pitch by simply pulling a portion of outer shell in opposition to the force exerted by a contrasting spring, for displacing said part of the shell from the fixed part of the shell by a distance sufficient to disengage a telescopic toothed joint between the two parts of the shell, and to release it after having rotated it by a certain angle to let the displaceable part to engage again with the fixed part of the shell in a desirably modified angular position.

Further advantages of the propellers disclosed in the latter patents mentioned above were provided by an improved manner of mounting the blades that may pivotally turn through the containment and support shell and by the introduction of resilient shock absorbing elements between the abutment surfaces on the end stops in order to dampen the impacts when starting rotation of the propeller in one or in the other direction.

In all these propellers having an adjustable internal kinematic system of transmission of the torque from the drive shaft to the pinion-hub and eventually to the shell-blade assembly of the propeller, it is of paramount importance to dampen the shocks caused by the impacts between the surfaces of the end stops that define the arc of freedom of rotation of the planetary mounted blades, in order to prevent or reduce the audible shock noise when starting to rotate the propeller and that specially when maneuvering for docking or other reasons becomes repetitive because of the numerous inversions of the direction of rotation (forward thrust/backward thrust) as well as to reduce wear and deformation of the metallic stop surfaces of the cooperating parts of the inner torque transmission kinematic system of the propeller.

Even accidental shocks that may be determined by a blade hitting a floating object when motoring may cause violent impacts on the stop surfaces, multiplying the shock noise and eventually cause a dent on the edge of the blade involved with the impact and contribute to the wear and deformation of the internal stop surfaces.

With the objective of enhancing a dampening action of these shocks to which important parts of the propeller are subjected, beside the use of special inserts between the abutting surfaces of the stops that define the angular bounds of freedom of mutual rotation of the shell-blade assembly and of the pinion-hub assembly, additional resilient elements of elastomer have been introduced to share among them part of the stress in order to spread on a relatively large number of elastomer elements the strain and thus reduce the rate of degradation with time of their ability to resiliently absorb the shock stresses and increase the effective lifetime of these resilient shock absorbing elements.

According to a known practice, a typical shock absorbing device for these type of propellers is commonly realized, by purposely realizing the pinion-hub, in two parts.

A first cylindrical flanged sleeve is keyed directly on the drive shaft of the propeller and the flange of the cylindrical sleeve is provided with a plurality of circular cavities, uniformly distributed around a circumference of the flange. An annular insert of elastomer is set inside each of these circular cavities.

The second part of the pinion-hub is constituted by a cylindrical sleeve provided with a terminal flange and that is slid over the cylindrical part of the first sleeve.

This second cylindrical sleeve has at one end a conical pinion toothing while a plurality of pins uniformly distributed around a circumference of its terminal flange and the pins extends from the end face thereof.

Upon assembling the propeller, the second cylindrical sleeve is slid over the first cylindrical sleeve already keyed on the drive shaft, and each annular insert of elastomer set in a respective circular cavity of the flange of the first cylindrical sleeve receives into its central hole the extremity of one of the pins that extend from the terminal flange of the second cylindrical sleeve.

In this way, the accidental shock that may occur to the rotating blades of the propeller as well as the impacts between mutually abutting stop surfaces of the internal kinematic system of the propeller that occur upon starting rotation in a direction, are in part absorbed also by the numerous annular inserts of elastomer that are (pinched) compressed by the respective pins similarly to what happens to the resilient inserts between the metallic stop surfaces of the pitch setting arc of freedom of mutual rotation between the pinion-hub assembly and the outer shell—planetary mounted blade assembly.

In this way, stresses are absorbed by numerous resilient inserts of elastomer, thus proportionally limiting the rate of wear and/or degradation of the elastic properties of the elastomer.

Of course, even if retarded, degradation in time of the shock absorbing ability of these resilient inserts of elastomer cannot be eliminated and therefore these elements must be periodically substituted, and this is normally done during maintenance and antifouling treatments of the hull.

Often, a protracted use of the boat well beyond the times of scheduled maintenance operations for many a reason, bring the propeller to work noisily under conditions of extreme degradation of the resilient inserts of elastomer before substitution of these inserts may take place. This often results in a severe deformation of the metallic stop surfaces which may eventually impose costly repairs and/or substitution of worn out pieces.

A need or opportunity exists of further increasing the lifetime of these shock absorbing resilient inserts of elastomer as well as of preventing that an excessive degradation and/or accidental shocks of extraordinary violence bring about a substantially complete destruction of these inserts and cause intolerable noisy operation of the propeller and a deformation of functionally important metallic stop surfaces.

SUMMARY OF THE INVENTION

To these needs has now been found an outstandingly effective solution of extremely simple implementation.

It has been found that by preventing situations in which, upon the occurrence of exceptionally violent shocks, the extraordinarily by large impulsive stress be supported fully by the resilient inserts, the lifetime of the latter may be outstandingly increased up to more than doubling it. This is due to the fact that premature degradation and eventual destruction of a resilient insert of elastomer is almost exclusively due to extraordinary compressive stresses, that is to shocks of exceptionally great violence that generally should be relatively rare or occasional.

This is achieved by implementing a plurality of stops between metal surfaces that may be reached only in the event of shocks of great violence and in any case following a certain elastic deformation of shock absorbing resilient inserts of elastomer, which remains though partial compared to a full compression of the elastomer (that is beyond the superelastic limit of the material).

The plurality and randomness in timing because of different elastic behavior of the multiple inserts of elastomer of the metal/metal stops determine in practice a certain randomness of the intensity of the distinct abutments of the metal stops surfaces that further enhances the overall effectiveness of the novel shock absorbing device of the present invention.

Substantially, the shock absorbing device of this invention is realized by forming at the bottom of each circular cavity housing a respective annular insert of elastomer of the flange of the first cylindrical sleeve that is directly keyed or in any case rotated by the drive shaft of the propeller, a hole coaxial to and of greater diameter than the diameter of the central hole of the annular insert of elastomer and of the relative engaging pin, and by prolonging the pins extending from the end face of the terminal flange of the second circular sleeve in such a way that each pin extends through the coaxially formed hole through the bottom of the respective circular cavity of the flange of the first sleeve.

In this way, the pins, though functionally engaging the respective rings of elastomer, upon the occurrence of a radial squeezing on the annular insert of elastomer beyond of a certain limit, came into contact with the wall of the cylindrical hole purposely formed through the bottom of the cavity housing the annular insert of elastomer of the flange of the first tubular sleeve, thus exerting the residual impact force (consequent of the shock) on the metal body of the first tubular sleeve.

Of course, eventual impacts of the pins against the metal wall of the holes formed through the bottom of the respective cavities housing the annular inserts of elastomer will be of relatively reduced violence because of the partial dissipation that occurs on compressing (though partially) the radial thickness of the insert of elastomer.

It has been surprisingly found that for identical elastomer rings and by establishing the eventual stop on the metal of the flange of the first sleeve of the metal pins of the second sleeve, after squeezing the elastomer rings by about 20% to 50% of its radial thickness, under normal conditions of use of the propeller, the effective lifetime of the shock absorbing ring inserts of elastomer of the propeller may be at least twice as long or even more the effective lifetime that is normally experienced with a similar propeller constructed according to the prior art without implementing metal/metal stops that prevent a complete (excessive) compression of the elastomer insert in case of exceptionally violent shocks.

BRIEF DESCRIPTION OF THE DRAWINGS

FIGS. 1a and 1b are views partially in cross-section of a pitch adjustable propeller with feathering blades, provided with the enhanced shock absorbing device according to the present invention.

FIGS. 2a, 2b and 3a, 3b are views of the first and second flanged cylindrical sleeves, respectively, that cooperatively realize the pinion-hub of the propeller.

DETAILED DESCRIPTION OF EMBODIMENTS

With reference to the drawings, wherein the same parts are identified with the same numbers, FIGS. 1a and 1b show in a simplified and partial manner an exemplary organization of parts of a pitch adjustable propeller with feathering blades, embodying the enhanced shock absorbing device of this invention.

A detailed description of all the functional components of a propeller of this type, which is generally known, would go beyond the object of this document that concerns exclusively the features of the novel enhanced shock absorbing device.

Nevertheless, by observing FIGS. 1a and 1b, certain fundamental characteristics of this type of propeller may be briefly recalled.

The drive shaft 1 of the propeller rotates a pinion-hub 2 onto which engage two or more planet gears 3, present at the base of the respective stems 4 of the blades 5, sustained through holes of the external shell 6 of the propeller.

The external shell 6 is generally composed by two or more sectors joined together by tangential screws 7 and rotates together with the blades.

The angular limits of freedom of relative movement of the planet gears 3 of the blades on the pinion-hub 2, that is the angular limits of the freedom of self orientation of the blades pivotally sustained through respective holes of the shell 6 under the effect of water resistance, from a neutral or central position as long as the boat advances under sail (drive shaft 1 idle) to a set stop that determines a certain pitch of the (screw) propeller in that direction of rotation, are established by a radial tooth 8, that in the example shown is mechanically connected to the drive shaft 1 through an axial extension 9 whose conical pinion end 10 engages with the planet gears 3 of the blades. The circular sector or radial tooth 8 cooperates with stop surfaces of a circular sector cavity into which the tooth 8 is confined that is mechanically connected to the shell 6, being formed in a terminal body 11 thereof, the end of which is eventually closed by an ogive 12 of the propeller.

The pinion-hub 2 is composed of two flanged cylindrical sleeves that are shown in more detail in FIGS. 2a, 2b and 3a, 3b, respectively.

In the embodiment shown, the first cylindrical sleeve 13 is directly keyed on the end portion of the drive shaft 1 of the propeller and on its flange 14 are present seven circular cavities 15, each of which contains an annular insert 16 of elastomer. The cavities 15 are uniformly distributed around the circumference C of the terminal flange 14 of the first cylindrical sleeve 13, as may be better seen in the axial projection.

The second cylindrical sleeve 17 has at one end a conical pinion toothing 2 and is slipped over the cylindrical portion of the first sleeve 13 around which may rotate.

From the end face of the terminal flange 18 of the second sleeve 17 extend seven pins 19 arranged in such a way to respectively extend through the central holes of the seven inserts 16 of elastomer held in the respective circular cavities 15 of the flange 14 of the first cylindrical sleeve 13, keyed on the drive shaft 1.

According to the present invention, through the bottom of each circular cavity 15 is present a hole 20 of diameter larger than the diameter of the pins 19 and of the diameter of the central hole of the annular insert 16 of elastomer. Moreover, the pins 19 have a length such that, upon assembling the parts together, they extend through the whole thickness of the annular inserts 16 of elastomer and through the hole 20 formed through the bottom of the respective circular cavity 15 of the flange 14 of the first cylindrical sleeve 13.

Construction details of the components of the enhanced shock absorber device of this invention may be better observed in the detailed FIGS. 2a, 2b and 3a, 3b, of the first flanged cylindrical sleeve 13 and of the second flanged cylindrical sleeve 17, composing the pinion-hub 2 of the propeller of FIGS. 1a and 1b.

Generally, the diameter of the holes 20 through the bottom of the circular cavities 15 housing the angular inserts 16 of elastomer is greater than the diameter of the pins 19 and of the central hole of the annular inserts 16 of elastomer (commonly identical) by few millimeters.

Preferably, the difference between the radius of the hole 20 and the radial thickness of the angular insert 16 of elastomer is comprised, in percentage terms, between 20% and 50%, depending on the characteristics of the elastomer.

Most preferably, such a difference corresponds to 20-30% of the thickness in a radial direction of the ring of elastomer.

The invention claimed is:

1. A shock absorbing device for an adjustable pitch propeller with feathering blades, each blade of which having a planet gear engaging on a pinion-hub rotated by a drive shaft and composed of a first flanged cylindrical sleeve keyed to the drive shaft, the flange of the first flanged cylindrical sleeve has a plurality of circular cavities uniformly distributed around a circumference of the flange, each cavity containing a resilient insert of elastomer, and a second flanged cylindrical sleeve slid on a cylindrical portion of said first sleeve and ending with said pinion, the terminal flange of the second flanged cylindrical sleeve having a plurality of pins uniformly distributed around a circumference of the flange, each pin engaging a respective annular insert of elastomer, characterized in that through the bottom of each of said circular cavities housing said annular inserts of elastomer of the flange of said first cylindrical sleeve is present a hole coaxial to the axis of a central hole of said annular insert of elastomer and having a diameter larger than a diameter of the central hole of the annular insert of elastomer and of the relative engaging pin and in that said pins extend through said coaxial hole present on the bottom of the respective circular cavities of the flange of said first cylindrical sleeve.

2. The shock absorbing device according to claim 1, wherein the difference between the radius of the coaxial hole through the bottom of each said circular cavity and the radial thickness of the annular insert of elastomer is comprised in percentage terms between 20% and 50% of said radial thickness of the annular insert of elastomer.

3. The shock absorbing device of claim 2, wherein said difference is comprised between 20% and 30% of said radial thickness.

* * * * *